Dec. 13, 1955     F. E. SETTE     2,726,770

FILTERS

Filed Nov. 3, 1953

INVENTOR.
FREDERICK E. SETTE
BY
Wheeler, Wheeler & Wheeler
ATTORNEYS

United States Patent Office 2,726,770
Patented Dec. 13, 1955

2,726,770

FILTERS

Frederick E. Sette, Scott Bar, Calif.

Application November 3, 1953, Serial No. 390,015

3 Claims. (Cl. 210—165)

This invention relates to improvements in filters. This application is a continuation in part of my co-pending application Serial No. 181,294, filed August 24, 1950, now abandoned, and entitled Combination Tank Fitting, Shut-Off Cock, and Filter.

The device of the present invention employs a cup-shaped ceramic filter having a filtering action greatly superior to that of the screen disclosed in my co-pending application aforesaid. The present invention resides in the means for mounting the cup-shaped ceramic filter and the filter bowl against the closure plate. This means includes a single bolt which is threaded into the end of a tubular stem which extends from the filter bowl closure through the ceramic filter. Means are provided for transmitting clamping pressure from said bolt to both the filter bowl and the ceramic filter whereby both the ceramic filter and the bowl are clamped to the closure and released therefrom by manipulating the bolt.

The device of this invention replaces the bail required in the device of my co-pending application aforesaid, provides for improved filter action through the ceramic filter, and simplifies and improves the manner of assembling and disassembling the component parts of the filter.

Figure 1:
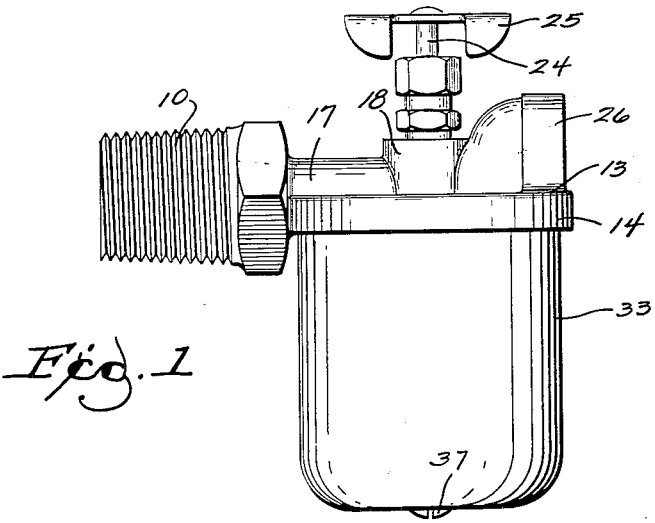
Fig. 1 is a side elevation of a filter device embodying my invention.

As in the device of my co-pending application aforesaid, I provide in one piece an externally threaded admission spud 10, bowl closure 13, outlet port housing 26 and valve housing 18. The spud 10 has a tapered internal bore 11 which receives a prestrainer 12 which has a tapered edge margin wedged into the taper of the bore 11.

Cast integrally with the spud 10 is a closure 13 having a peripheral ring flange 14 within which is seated an annular gasket 15. The bore 11 of the admission spud 10 communicates through a passage 16 formed in rib 17 embossed on the upper surface of the closure and valve housing 18 to a valve chamber 19 having a tapered seat 20 with respect to which a vertically reciprocal valve plug 23 is movable.

Valve plug 23 is provided with a threaded valve stem 24 manipulated by the external handle 25 for opening and closing the valve.

The closure 13 is also provided with an integrally cast outlet port housing 26 through which the outlet port 27 is formed. The housing 26 may be internally threaded at 28 for connection to the input pipe of a device using liquid passed through the filter device.

Figure 2:
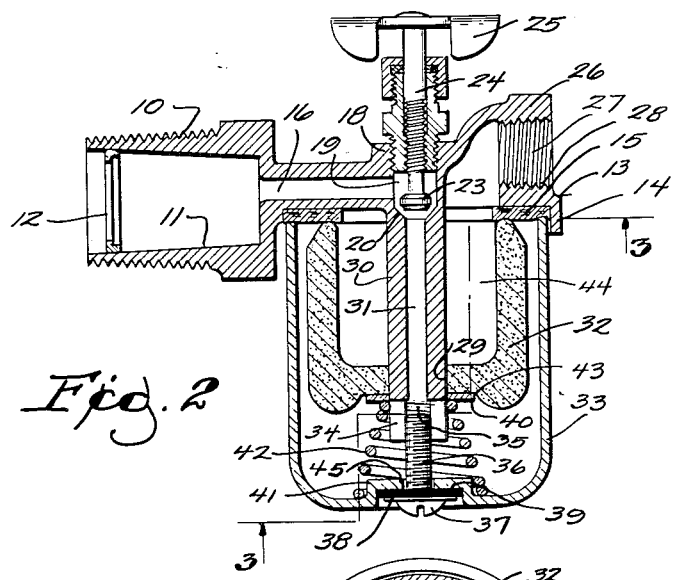
Fig. 2 is a vertical cross section taken through the device of Fig. 1.
Figure 3:
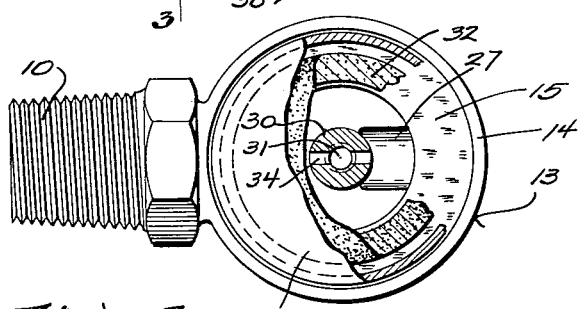
Fig. 3 is a cross sectional view taken along the line 3—3 of Fig. 2.

Closure 13 is provided with a tubular stem 30 substantially perpendicular to the plane of the closure. Stem 30 extends through a hole 29 in the bottom of filter cup 32. Gasket 40 seated in recess 43 of the filter cup seals the cup to the stem. The stem has an internal bore 31 for passage of liquid from duct 16, under the control of valve plug 23, into the space between cup-shaped ceramic filter 32 and the filter bowl 33. As best shown in Figs. 2 and 3 the end of tubular stem 30 is provided with lateral slots or openings 34 for liquid discharge about the end of threaded bolt 36 which engages threads 35 formed on the wall of the tube bore. Head 37 of bolt 36 engages gasket 38 within a recessed seat 39 in the bottom of the bowl 33. The gasket seals the bowl about the opening 45 through which the bolt 36 extends. By tightening bolt 36 the bowl 33 may be clamped and sealed against the outer periphery of the annular gasket 15.

To clamp and seal the ceramic filter cup against the inner periphery of gasket 15, compression spring 42 is disposed between the bottom of bowl 33 and gasket 40 in the recessed seat 43 formed in the bottom of ceramic filter cup 32. The spring may be tapered and desirably has its smallest coil engaged with stem 30 and its largest coil engaged with boss 41 on the filter bowl bottom. As bolt 36 is tightened spring 42 is compressed, thereby sealing filter cup 32 against the inner periphery of the annular gasket 15.

Accordingly, both ceramic filter cup 32 and filter bowl 33 are clamped and sealed against concentric portions of the same gasket 15. Simple removal of the bolt 36 completely disassembles the ceramic filter 32 and the bowl 33 from the tubular stem 30.

As in the device of my co-pending application aforesaid, the valve seat 20 is at substantially the same level as the gasket 15.

The ceramic filter cup comprises diatomaceous earth which has been baked together with a binder to rigidify it in the cup form illustrated. The openings through it are minute. The smooth surface readily sheds intercepted foreign matter when flow stops, leaving the filter clean.

Admission spud 10 may be screwed into a threaded bung in an oil barrel or the like and the admission pipe of an oil burner threaded into the outlet port 27. Thus, under the control of valve 23, oil from the barrel will enter the filter device through passage 16, valve 23, bore 31 of the tubular stem, slots 34 of the stem and into the chamber space between the ceramic filter 32 and bowl 33. The oil will then flow upwardly through the filter, into the chamber 44 therewithin and thence through the outlet port 27 into the oil burning device.

By reason of the upward flow of liquid through the device foreign matter will tend to settle by gravity to the bottom of the bowl from whence it can be removed by periodic cleaning. Such foreign matter as is arrested by the filter may likewise settle by gravity to the bottom of the bowl 33 when the filter is idle. The filtering action of the ceramic filter is so fine that even the tiniest particles of foreign matter are removed from the liquid. The pores of the filter are so small there is no possibility of particles of foreign matter entering them to clog the filter.

I claim:

1. A filter device comprising the combination with a top closure, said closure having admission and outlet ports, of a bowl and a ceramic filter cup within said bowl, said cup being provided with a cylindrical side wall, a bottom and a bottom aperture coaxial with the side wall, both said cup and bowl being closed by said closure, said filter cup being spaced from the bowl to form a chamber therebetween, and a tubular stem extending from said closure through said filter cup bottom aperture and into said bowl the end of said stem being spaced from said bowl, said stem having an internal passage communicating with one of said ports and opening to said chamber, the end of said stem being provided with an internal thread, said bowl being provided with a bottom aperture aligned with said stem, a bolt having a head engaged with the bowl and a threaded shank spanning the space between the bowl and stem and engaged with the stem threads, a coil spring coaxial with said bolt and biased for resilient engagement with said filter cup and bowl whereby release of the bolt for removal of the bowl also releases the spring for removal of the filter cup, a gasket between the bolt head and bowl for sealing the bowl aperture and a gasket between the spring and ceramic cup bottom to seal the stem to the cup.

2. The device of claim 1 in which said bowl has an internal boss about its bottom aperture of substantially greater diameter than the stem, said coil spring comprising a section of a cone having its largest coil seated about said boss and its smallest coil seated about said stem and in pressure engagement with the stem gasket to tend to deform said gasket into sealing engagement between said ceramic cup and stem.

3. A filter device comprising a one-piece admission spud, bowl closure, valve housing and outlet port, said closure being provided with a tubular stem aligned with said valve housing, a ceramic filter cup having a bottom aperture through which the stem extends, a bowl, and means for releasably connecting said bowl to said stem in spaced relation to said filter cup, said closure being provided with an imperforate annular gasket against which said filter cup and said bowl concentrically seat, the means for connecting the bowl to the stem comprising a bolt having a shank spanning the space between the stem and bowl and having a head engaged with the bowl, and a spring between said bowl and cup, said bolt comprising means for clamping said cup to said gasket through said spring and concurrently clamping said bowl to said gasket.

References Cited in the file of this patent

UNITED STATES PATENTS

| 546,973 | Gould | Sept. 24, 1895 |
| 1,062,236 | Hitchcock | May 20, 1913 |
| 2,567,062 | Edelen | Sept. 4, 1951 |

FOREIGN PATENTS

| 298,070 | Italy | June 27, 1932 |
| 512,758 | Germany | Nov. 17, 1930 |
| 778,295 | France | Dec. 22, 1934 |